No. 738,180. PATENTED SEPT. 8, 1903.
H. B. GILLETTE.
BICYCLE BEARING.
APPLICATION FILED JAN. 9, 1900.
NO MODEL. 2 SHEETS—SHEET 1.
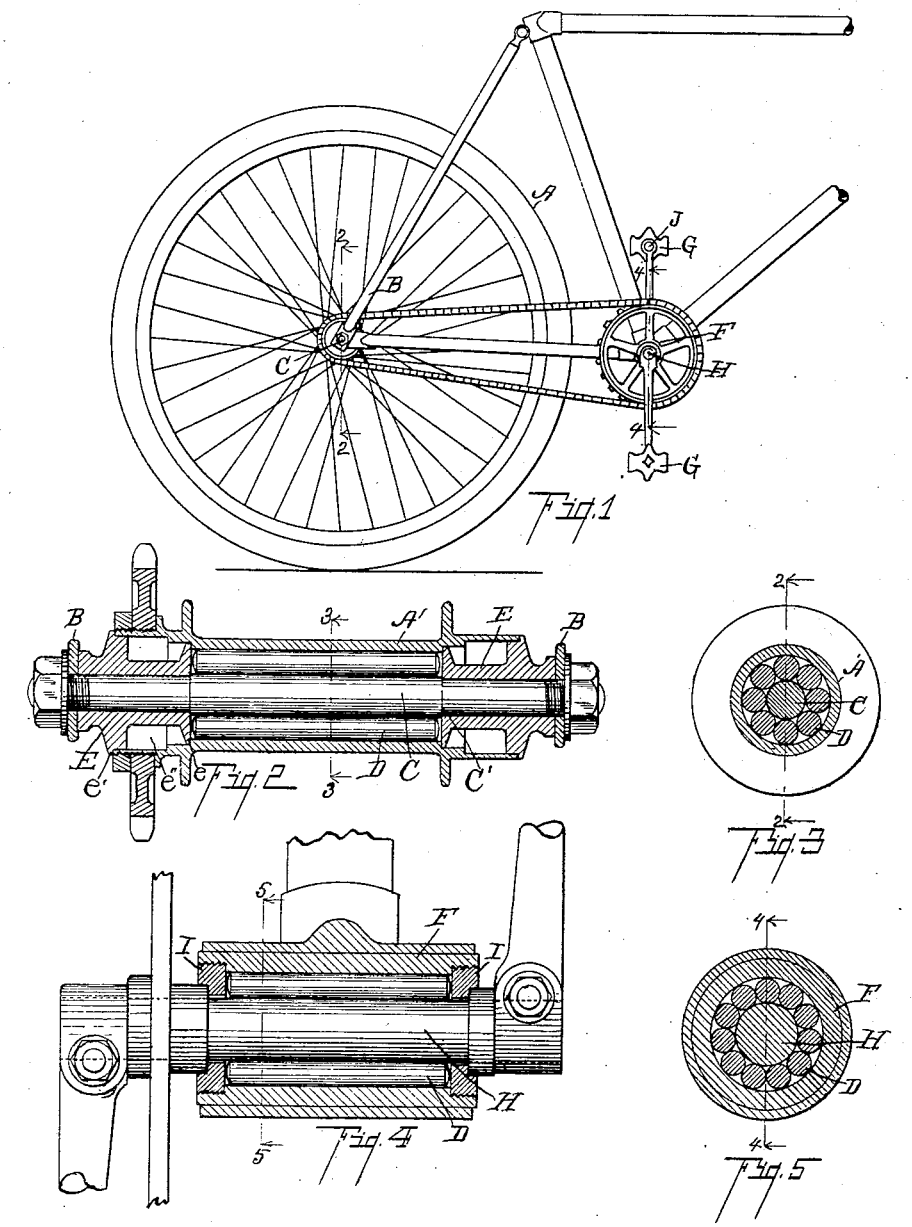
Witnesses:
Alice Houghton
Otis A. Earl
Inventor,
Herbert B. Gillette
By Fred L. Chappell
Att'y.

No. 738,180. PATENTED SEPT. 8, 1903.
H. B. GILLETTE.
BICYCLE BEARING.
APPLICATION FILED JAN. 9, 1900.
NO MODEL. 2 SHEETS—SHEET 2.

Witnesses:
Alice Houghton
Otis A. Earl

Inventor,
Herbert B. Gillette
By Fred L. Chappell
Att'y.

No. 733,180. Patented September 8, 1903.

UNITED STATES PATENT OFFICE.

HERBERT B. GILLETTE, OF BENTON HARBOR, MICHIGAN.

BICYCLE-BEARING.

SPECIFICATION forming part of Letters Patent No. 738,180, dated September 8, 1903.

Application filed January 9, 1900. Serial No. 902. (No model.)

*To all whom it may concern:*

Be it known that I, HERBERT B. GILLETTE, a citizen of the United States, residing at the city of Benton Harbor, in the county of Berrien and State of Michigan, have invented certain new and useful Improvements in Bicycle-Bearings, of which the following is a specification.

This invention relates to improvements in bicycles.

The objects of the invention are, first, to provide a bicycle which shall be strong, rigid, and durable and easy and cheap to manufacture; second, to provide a bicycle in which the bearings are constructed so as to brace and strengthen the frame; third, to provide a bicycle capable of carrying very heavy loads and one in which the power necessary to propel the same when so loaded is greatly diminished; fourth, to provide a bicycle the bearings of which are so constructed as to require no adjustment in its bearings. Further objects will definitely appear in the detailed description to follow. I accomplish these objects of my invention by the devices and means described in this specification.

The invention is clearly defined, and pointed out in the claims.

A structure fully embodying the features of my invention is illustrated in the accompanying drawings, forming a part of this specification, in which—

Figure 6:
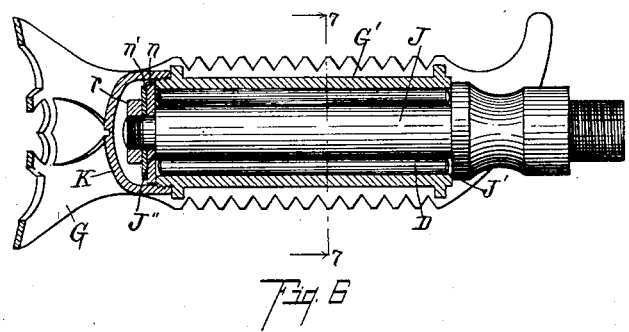
Figure 7:
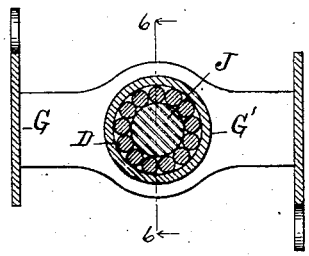

Figure 1 is a detail side elevation of my improved bicycle, the front of the frame being broken away and saddle omitted. Fig. 2 is an enlarged detail sectional view through the hub of the rear wheel, taken on lines 2 2 of Figs. 1 and 3, the shaft or axle and the rollers being in full lines. Fig. 3 is a detail cross-sectional view taken on line 3 3 of Fig. 2. Fig. 4 is an enlarged detail sectional view through the crank-hanger and bearings, taken on lines 4 4 of Figs. 1 and 5, the shaft and rollers being in full lines. Fig. 5 is a detail cross-sectional view taken on line 5 5 of Fig. 4. Fig. 6 is an enlarged detail sectional view of the pedal, taken on line 6 6 of Fig. 7, the spindle and rollers being shown in full lines. Fig. 7 is a detail transverse view of the pedal, taken on line 7 7 of Fig. 6.

In the drawings similar letters of reference refer to similar parts throughout the several views.

To carry out my improvements, I provide all the bearing parts of my bicycle with roller-bearings, whereby the axles or spindles are embraced for their entire length by the rollers, which arrangement greatly strengthens and positively prevents their springing and also serves to brace and strengthen the frame, making the same very rigid and strong.

Referring to the lettered parts of the drawings, B represents a bicycle-frame, which may be of any desired construction, the one shown being what is known as the "diamond" frame.

A is the rear wheel, and A' the hub thereof.

C is the rear axle, and D the rollers of the bearing.

E is a double-flange collar sleeved upon the axle C to retain the rollers in position and to prevent thrust motion thereof, exclude dust, and also serve to retain the frame in its proper position. The axle C is shouldered at C' to secure the proper locating and adjustment of the collars E. The collar E is provided with an inner flange $e$ for retaining and forming the end bearing for the rollers. The outer flange $e'$ of the collar E is shouldered to cover the outer end of the hub to exclude dust and to give a finished appearance, and any dust which may chance to pass this flange will lodge in the groove formed by the flanges $e$ and $e'$. The rollers D are fitted into the boxing as closely as possible, so that they not only impinge against the axle and against the bearing within the hub, but also against each other. By this arrangement the rollers serve as guides for each other and prevent their getting out of alinement, and consequently bent or stuck fast. Also when the rollers impinge against each other when one of the rollers turns its motion is imparted to the others, which prevents their becoming stuck fast and secures even wearing of the same. This tight fitting and the engaging of the axle for the entire length of the bearing supports and strengthens the axle, avoiding springing of the same, which is liable to happen in ball-bearings, and the tight fit also serves to brace and strengthen the bicycle-frame, making the same very rigid. I apply this principle to all the bearings of my bicycle with such variations as may be necessary due to their position. I have described the rear hub and bearing. The hub of the forward wheel is substantially identical.

In the crank-hanger I provide a boxing F, (a similar boxing may be used in the hubs and other bearings when desirable,) suitably secured in position. Collars I are screwed into the boxing to retain the rollers in position and serve as dust-excluders, suitable shoulders being provided to insure the proper positioning of the collars. It will be readily seen that the collars I might be sleeved or secured upon the shaft H instead of being secured to the boxing or hub.

In the pedal, as shown in Figs. 6 and 7, G is the pedal-frame proper. G' is its hub or boxing. J is the spindle, which is shouldered at J' to form an end bearing for one end of the rollers and to close one end of the boxing. On the opposite end the spindle is also shouldered at J' to provide a seat for a collar $n$, which is held in position by a suitable washer $n'$ and nut $r$. For this end of the boxing I provide a suitable dust excluder or cap K, screwed into suitable threads on the outside of the boxing.

The rollers D in all of the bearings are fitted into place as closely as possible, as before described, the ends of the same being rounded to reduce the end bearing-surface.

A bicycle constructed in this manner is very strong, rigid, durable, and easy running.

It will be seen from this description that the structure can be greatly varied in its details without departing from my invention. While I consider the structure shown to be very desirable, I desire to state that many variations in the detail can be made and the structure be equally effective.

Having thus described my invention, what I claim as new, and desire to secure by Letters Patent, is—

1. In a bicycle, the combination of a hub; a boxing therefor; an axle C; rollers D; double-flanged collars sleeved upon said axle and shouldered into said hub and secured thereto to retain the rollers in position and to exclude the dust, all coacting for the purpose specified.

2. In a bicycle, the combination of a hub A'; an axle C; rollers D; double-flanged collars E sleeved upon said axle and shouldered into said hub and secured in position to retain the rollers and to exclude the dust, all coacting for the purpose specified.

3. In a bicycle, the combination of a hub; an axle; rollers D; double-flanged collars sleeved upon said axle and means of securing the said flanged collars in position to retain the rollers and to exclude the dust, as specified.

In witness whereof I have hereunto set my hand and seal in the presence of two witnesses.

HERBERT B. GILLETTE. [L. S.]

Witnesses:
W. H. HOLLIS,
GEO. W. BRIDGMAN.